United States Patent [11] 3,568,026

| [72] | Inventor | Otto Anna<br>Niederhoechstadt, Germany |
|---|---|---|
| [21] | Appl. No. | 724,888 |
| [22] | Filed | Apr. 29, 1968 |
| [45] | Patented | Mar. 2, 1971 |
| [73] | Assignee | Braun Aktiengesellschaft<br>Frankfurt(Main), Germany |
| [32] | Priority | Apr. 29, 1967 |
| [33] | | Germany |
| [31] | | B92318 |

[54] DC MOTOR SPEED CONTROL FOR OPERATION OVER A WIDE RANGE OF SUPPLY VOLTAGES
8 Claims, 3 Drawing Figs.

[52] U.S. Cl. .................................. 318/330, 318/345
[51] Int. Cl. .................................. H02p 5/08, H02p 5/16
[50] Field of Search.......................... 318/329, 330, 331, 341, 345, 505, 519; 323/4, 22T, 38, (Inquired)

[56] References Cited
UNITED STATES PATENTS

| 3,214,668 | 10/1965 | Brinster | 318/345 |
|---|---|---|---|
| 3,221,236 | 11/1965 | Scholl | 318/330X |
| 3,309,596 | 3/1967 | Limley | 318/331 |
| 3,345,551 | 10/1967 | Slavin et al. | 318/345 |
| 3,412,306 | 11/1968 | Fischer | 318/331 |
| 3,439,253 | 4/1969 | Piteo | (320/SCR) |
| 3,447,056 | 5/1969 | Shinya Kosaka et al. | 318/345X |

*Primary Examiner*—Oris L. Rader
*Assistant Examiner*—H. Huberfeld
*Attorney*—Michael S. Striker ABSTRACT: A control arrangement for adapting the operation of a DC motor, of the instrument type, to a voltage source which may have different supply levels over a substantially broad range. When control and adaptation circuitry is in electronic form, a switching transistor is connected in series with the motor and the power supply for operating the same. An RC network is connected across the motor terminals. A Zener diode is connected in series with a resistor, and the series circuit is, in turn, connected in parallel with the capacitor of the RC network. The base of a transistor amplifier is connected to the junction between the Zener diode and the resistor connected thereto, and the amplified voltage from the transistor amplifier is applied to the switching transistor. As a result, the switching transistor is turned on or off as a function of the voltage applied to the motor. In a mechanical design embodiment, a mechanical switching arrangement is connected in series and between the motor and the voltage supply. A speed governor is mechanically coupled to the motor and actuates the switch so that the motor will be intermittently connected to the voltage supply depending upon the speed of the motor. The arrangement is such that the power supplied to the motor is maintained at the rated design value of the motor.

PATENTED MAR 2 1971         3,568,026

INVENTOR

BY

ATTORNEY

DC MOTOR SPEED CONTROL FOR OPERATION OVER A WIDE RANGE OF SUPPLY VOLTAGES

BACKGROUND OF THE INVENTION

The present invention for compensating against variations in the DC voltage supply for driving electrical motors, is particularly applicable to shaving apparatus, tooth brushes, etc., in which the motor is designed for the lowest voltage that may be incurred.

In electronic instruments which may be operated with different or varying DC voltages, it is has been common to switch the driven apparatus in a manner so as to take into account the prevailing supply voltage.

It has been found, however, that damage or complete destruction of the apparatus involved occurs when the user forgets to switch the apparatus to the state corresponding to the prevailing supply voltage. This forgetfulness on the part of the user is the common situation.

It is the principal object of the present invention to provide motor-driven apparatus such as electrical shavers or tooth brushes, which can be connected to different voltage supplies without requiring a switching action.

The object of the present invention is achieved through the use of a control arrangement connected between the motor and the voltage supply. This control arrangement is located in the same housing as the driving motor and is influenced by the operating state of the motor. The design of the control arrangement is such that the power transferred from the control arrangement to the motor is equal to the DC rated power of the motor.

In one embodiment of the present invention, the control arrangement includes a switching transistor connected in series with the motor. An RC network is connected in parallel with the motor terminals. The capacitor of the RC network is, in turn, connected in parallel with a series circuit consisting of a resistor and a Zener diode. A transistor amplifier amplifies the voltage drop appearing across the resistor connected in series with the Zener diode, and applies this voltage to the switching transistor.

It is of particular advantage to connect a capacitor between the base of the switching transistor and the input of the amplifier. It is also desirable to connect a diode across or in parallel with the driving motor. In a further embodiment of advantageous design, in accordance with the present invention, the control arrangement includes a speed governor which may operate, for example, on the centrifugal force principle. The action of the speed governor is such that depending upon the speed of the motor, the latter is intermittently connected to the voltage supply source.

SUMMARY OF THE INVENTION

A control circuit arrangement for adapting DC instrument motors to variable voltage power supplies. The control circuit is connected between the power supply and the DC motor which is to be operated. The control arrangement detects the voltage applied to the motor and operates a switching arrangement whereby the motor may be connected and disconnected from the power supply. In an electronic embodiment of the control arrangement, an RC network is applied across the motor, and a series circuit of a Zener diode and resistor is, in turn, connected in parallel with the capacitor of the RC network. A transistor amplifier detects the voltage across the resistor in series with the Zener diode and applies it to a switching transistor connected in series with the motor and the power supply. Depending upon whether the voltage applied across the motor is above or below the rated value of the motor, the switching transistor is turned off or on and thus regulates the flow of power from the energy source to the motor. In a further embodiment of the present invention, the control arrangement is provided in the form of a speed governor which may operate on the principle of a centrifugal force governor. If the speed of the motor exceeds the permissible rated value of the motor, the speed governor actuates a switch which disconnects the power supply from the motor. When, on the other hand, the motor speed is below the rated value, the speed governor closes the switch so as to connect the motor to the power supply.

The novel features which are considered as characteristic for the invention are set forth in particular in the appended claims. The invention itself, however, both as to its construction and its method of operation, together with additional advantages and objects thereof, will be best understood from the following description of specific embodiments when read in connection with the accompanying drawing.

DESCRIPTION OF THE PREFERRED EMBODIMENTS

Figure 1:
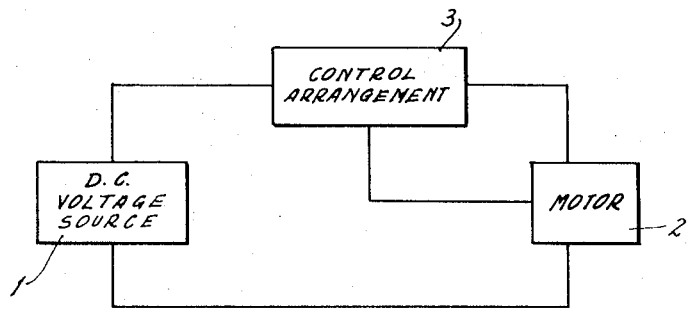
FIG. 1 is a functional block diagram and describes the operating principle of the arrangement whereby a DC instrument motor is connected to a variable DC voltage supply.

Referring to the drawing and in particular FIG. 1, the DC voltage source 1 provides electrical energy at a voltage which has a level that may vary considerably. The voltage source 1 serves for driving a small amount of equipment consisting of an electrical motor 2 and a control arrangement 3. If the output level of the DC voltage source 1 is equal to the nominal voltage of the motor 2, then the control arrangement connects the motor directly to the voltage source. If, on the other hand, the output level of the DC voltage source 1 is higher than the nominal voltage of the motor, then the control arrangement will connect the motor to the voltage source so that the power transferred by the control arrangement is equal to the DC rated power of the motor. The control arrangement performs this function in dependency upon the operating state of the motor. The circuitry of the arrangement is designed so that the motor may be operated, without switching in resistors or coils, even when the voltage level of the DC source 1 exceeds the nominal value of the motor.

Figure 2:
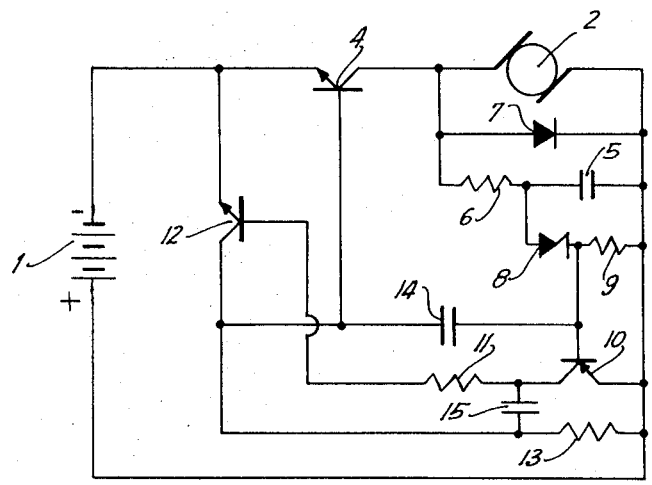
FIG. 2 is an electrical schematic diagram of an electronic embodiment of the control arrangement for operating the DC instrument motor of FIG. 1.

FIG. 2 shows an exemplary embodiment of an electronic control arrangement whereby the motor 2 is connected to the voltage source 1, by way of a switching transistor 4. Connected in parallel with the motor 2 is an RC network comprised of a capacitor 5 and the resistor 6. The RC network is, in turn, bridged or connected in parallel with a diode 7. The capacitor 5 of the RC network is connected in parallel or bridged by a series circuit including a Zener diode 8 and resistor 9. Connected to the junction of the Zener diode 8 and the resistor 9, is the base of a transistor 10. The collector of this transistor 10 is connected, by way of a resistor 11, to the base of a transistor 12. The collector of the transistor 12 leads to the negative potential or supply terminal of the voltage source 1, by way of the resistor 13.

If, now, in operation the voltage across capacitor 5 rises so that the Zener voltage across the diode 8 is exceeded, a voltage drop appears across the resistor 9 and affects the transistor 10. As a result, the transistor 12 is turned on, while the switching transistor 4 is turned off. The latter remains turned-off or in the nonconducting state, until the voltage at the base of the transistor 10 drops below the Zener voltage of the Zener diode 8, through operation of the motor 2. Thereupon the switching transistor 4 is again turned on through a similar manner. Since the rate of charging of the capacitor 5 is dependent upon the voltage level of the DC source 1, a pulsating DC current results through the driving motor 2. The width of the pulse is a function of the voltage level of the DC source 1. It is the purpose of the diode 7 connected in parallel with the motor 2, to inhibit voltage spikes. Such spikes may result as a result of switching the operating coil of the driving motor 2. The capacitors 14 and 15 contribute to the steepening of the trailing edge of the pulsating DC current applied to the driving motor. As a result, the time interval during which the switching transistor 4 exhibits electrical resistance, is decreased. The heating of the transistor is thus diminished.

Figure 3:
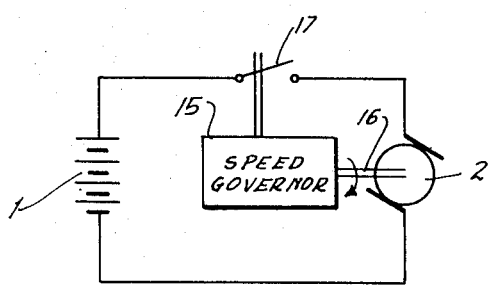
FIG. 3 is a functional diagram of an embodiment of FIG. 1 in which the control arrangement includes a mechanical speed governor for performing the controlling functions, in accordance with the present invention.

FIG. 3 shows the control arrangement 3 of FIG. 1, when designed as a mechanical embodiment including a speed governor 15. The latter is coupled to the shaft 16 of the motor 2 and also actuates a switch 17. When the nominal speed of the motor is exceeded as a result of the voltage applied to the motor, the speed governor 15 opens the switch 17. Thus, when the voltage delivered by the source 1 exceeds the nominal value of the motor for which the latter is rated, the speed of the motor will increase, and the speed governor will thereby be initiated to actuate the switch 17. If, on the other hand, the speed of the motor drops below the nominal or rated value, the speed governor 15 closes again the switch 17. The motor becomes thereby again accelerated to its nominal or rated speed. Accordingly, the motor is always operated in the vicinity of its nominal or rated speed, and independent of the level of the output voltage of the DC supply source.

It will be understood that each of the elements described above, or two or more together, may also find a useful application in other types of DC motor control circuits differing from the types described above.

While the invention has been illustrated and described as embodied in a DC motor control circuit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptation should and are intended to be comprehended within the meaning and range of equivalence of the following claims.

I claim:

1. A direct-current motor control arrangement comprising, in combination, a housing; direct-current motor means within the housing and having a rated operating voltage for operating at a design rated speed; a direct-current energy source for supplying operating power to said motor and having an output voltage level variable within a substantially broad range of voltage values; control circuit means within said housing and connected between said motor means and said energy source for intermittently supplying operating power to said motor means and equaling said intermittent power to the DC rated power of said motor means, said control circuit means comprising: switching transistor means connected in series with said motor means; resistor-capacitor network means connected in parallel with said motor means and having a resistor and capacitor connected in series, said series circuit of said resistor and capacitor being connected in parallel with said motor means; Zener diode circuit means having a Zener diode connected in series with auxiliary resistor means, said Zener diode circuit means being connected in parallel with said capacitor of said resistor-capacitor network means; transistor amplifier means connected to said auxiliary resistor means for amplifying the voltage drop across said auxiliary resistor means and applying the amplified voltage to said switching transistor means; and auxiliary capacitor means connected between the base of said switching transistor means and the input of said transistor amplifier means.

2. The direct-current motor control arrangement as defined in claim 1, including additional transistor means connected to said transistor switching means and said transistor amplifier means.

3. The direct-current motor control arrangement as defined in claim 2, including base resistor means connected between the base of said additional transistor means and the collector of said transistor amplifier means, the emitter of said additional transistor means being connected to the emitter of said switching transistor means and the collector of said additional transistor means being connected to the emitter of said transistor amplifier means.

4. The direct-current motor control arrangement as defined in claim 3, including coupling capacitor means connected between said base resistor means and the collector of said additional transistor means.

5. The direct-current motor control arrangement as defined in claim 4, including collector-resistor means connected between the collector of said additional transistor means and the emitter of said transistor amplifier means.

6. A direct-current motor control arrangement comprising, in combination, a housing; direct-current motor means within the housing and having a rated operating voltage for operating at a design rated speed; a direct-current energy source for supplying operating power to said motor and having an output voltage level variable within a substantially broad range of voltage values; and control circuit means within said housing and connected between said motor means and said energy source for intermittently supplying operating power to said motor means so that the intermittently supplied power is equal to the DC rated power of said motor means, said control circuit means comprising switching transistor means connected in series with said motor means; resistor-capacitor network means connected in parallel with said motor means and having a resistor and capacitor connected in series, said series circuit of said resistor and capacitor being connected in parallel with said motor means; Zener diode circuit means having a Zener diode connected in series with auxiliary resistor means, said Zener diode circuit means being connected in parallel with said capacitor of said resistor-capacitor network means, and transistor amplifier means connected to said auxiliary resistor means for amplifying the voltage drop across said auxiliary resistor means and applying the amplified voltage to said switching transistor means.

7. The direct-current motor control arrangement as defined in claim 6, including auxiliary diode means connected in parallel with said motor means.

8. The direct-current motor control arrangement as defined in claim 6, including connecting means for connecting the base of said transistor amplifier means to the junction of said Zener auxiliary means and said diode resistor means.